CROSSBAR SWITCHING SYSTEM HAVING SPLIT GROUP HUNTING

Filed July 17, 1967 3 Sheets-Sheet 1

INVENTOR
H. M. ANDERSON
BY
ATTORNEY

CROSSBAR SWITCHING SYSTEM HAVING SPLIT GROUP HUNTING

Filed July 17, 1967 3 Sheets-Sheet 2

Oct. 27, 1970 H. M. ANDERSON, JR 3,536,844

CROSSBAR SWITCHING SYSTEM HAVING SPLIT GROUP HUNTING

Filed July 17, 1967 3 Sheets-Sheet 3

United States Patent Office 3,536,844
Patented Oct. 27, 1970

3,536,844

CROSSBAR SWITCHING SYSTEM HAVING SPLIT GROUP HUNTING

Hubert M. Anderson, Jr., Rio Pedras, Puerto Rico, assignor to International Telephone and Telegraph Corporation, New York, N.Y., a corporation of Delaware Filed July 17, 1967, Ser. No. 653,908
Int. Cl. H04q 3/06
U.S. Cl. 179—18 4 Claims

ABSTRACT OF THE DISCLOSURE

Optional strapping may be arbitrarily connected between a terminal identified by a PBX directory number and any arbitrary one of many common start of hunting and end of hunting relays in a marker. It is not necessary for these strappings to have any preconceived relationship to the normally occurring blocks of directory numbers. Moreover, all groups of ten trunks use the same start and end of hunting relays so that they do not have to be duplicated. Therefore, there is no runaway condition which greatly increases the number of relays required for hunting. Since there is no direct relationship between the directory number and equipment location, there is a maximum flexibility in the assignment of line numbers.

This invention relates to PBX trunk hunting in common controlled telephone switching systems, and more particularly to such systems which are equipped to hunt over groups of PBX lines which are smaller than the smallest naturally occurring block of directory numbers.

Since the most commonly used number system is one counting on the base of ten, ten consecutive numbers from a naturally occurring block of directory numbers. An entire block of such may be selected and designated by the selection of a pertinent tens number. This immediately suggests that the conditions in groups of ten equipments each may be investigated by stepping a tens number digit counter. However, this also presupposes that there are, in fact, exactly ten such equipments in each group. If there are more than ten such equipments, it is a fairly simple matter to step the tens counter two (for example) steps sequentially to investigate the conditions twenty equipments, or three steps to investigate thirty equipments, etc.

On the other hand, if each group of equipments contains less than ten such equipments, it is no longer possible to investigate all of these equipments in a single group by the expedient of stepping a tens counter. Instead, it becomes necessary to gate a selected number of such equipments, into a connection with the investigating equipment. The problem becomes more difficult if the small group may contain any arbitrary number of equipments.

An example of a circuit for providing such group investigation, as described above, is presented by PBX trunk hunting circuits of the type used in automatic telephone switching systems. Here, a number of lines lead from a central office to a private branch exchange (PBX). All lines in the PBX group are identified by a single directory number. As long as the calling subscriber reaches the branch exchange after he has dialed that directory number, he does not really care whether he goes in on one line or another—any idle line will do. Thus, it becomes a problem of selecting the first available one of the PBX group of lines. Therefore, the invention is primarily concerned with making this selection on a basis of idle or busy line conditions within the PBX group, and more particularly to making the selection when there are fewer than ten lines in each PBX group.

Known crossbar switching systems usually include means for hunting over PBX groups of called lines which are less than ten in number. In such an arrangement, the directory number usually identifies the first line in the group of lines leading to the PBX. If that line is busy, the system selects the next idle line. If, for example, there are only three lines in the PBX group of lines and if there are ten numbers in the block of numbers which identify a PBX group, it is a gross waste of capacity to leave seven unused directory numbers. This waste of capacity cannot be tolerated because four digits cannot identify more than 9999 lines. This, then, becomes the absolute size of an office using four line numbers—which is the conventional arrangement. If a large percentage of these numbers are wasted, the total cost of building, common equipment, power supplies, etc. must be distributed over fewer lines, and the cost per line increases.

When it has been necessary to provide PBX groups having less than ten lines, it has been common place for these known crossbar systems to provide a sleeve cut through relay (commonly called an "SC relay") for connecting the sleeves of each line in the small PBX group to the marker. Thus, for example, if one tens block of directory numbers included five PBX groups of two lines each, five SC relays were required, each being used to connect through one of the two wire groups.

The disadvantage of this known arrangement are two fold. First, very many SC relays were sometimes required. Second, and more important, it has ben difficult to mount all of these relays in the available rack space. For example, if every tens block of directory numbers represented a completely different PBX group, only one hundred SC relays are required for one-thousand numbers. But, if each PBX group included only two lines, five hundred SC relays are required. The difficulty is the unpredictable nature of these requirements. If rack space is provided for five-hundred SC relays, most of the space is wasted most of the time. On the other hand, if rack space is limited to, say one hundred SC relays, there is no room for an excessive number of relays when they are required. This means that extra racks are required to support these relays and that, in turn requires costly cabling.

Accordingly, an object of the invention is to assign trunk hunting directory numbers to groups of lines which are smaller than the standard size so that there will be no unintended waste of directory numbers. Another object of the invention is to provide means whereby two or more small groups of lines may share a single block of directory numbers without increasing the number of SC relays.

A further object of the invention is to provide initially small PBX groups of lines without wasting the original numbering capacity and yet to provide a means whereby the small group may be expanded later, by translation, to become a large group spilling over into the next tens block, if need be.

In keeping with an aspect of the invention, these and other objects are accomplished by means of a number group translator including no more than one SC relay per tens block of directory numbers. When a directory number of a PBX is received, the translator reads out an unused ringing code. A start of hunting relay and an end of hunting relay operate in the marker. Since all of the SC relays in the translator share the same group of start and end of hunt relays in the marker, there are no increases in the number of SC relays, regardless of how small the PBX groups may become. The marker then selects the first idle one in the small group of lines identified by the start and end of hunting strappings. The translator then reads out to the marker the location of the equipment required to complete a connection to the selected line.

The above mentioned and other objects of this invention and the manner of obtaining them will become more apparent, and the invention itself will be best understood by reference to the following description of an embodiment of the invention taken in conjunction with the accompanying drawings, in which:

FIG. 6 shows how FIGS. 4 and 5 should be joined to provide a complete circuit.

Figures 1, 2:
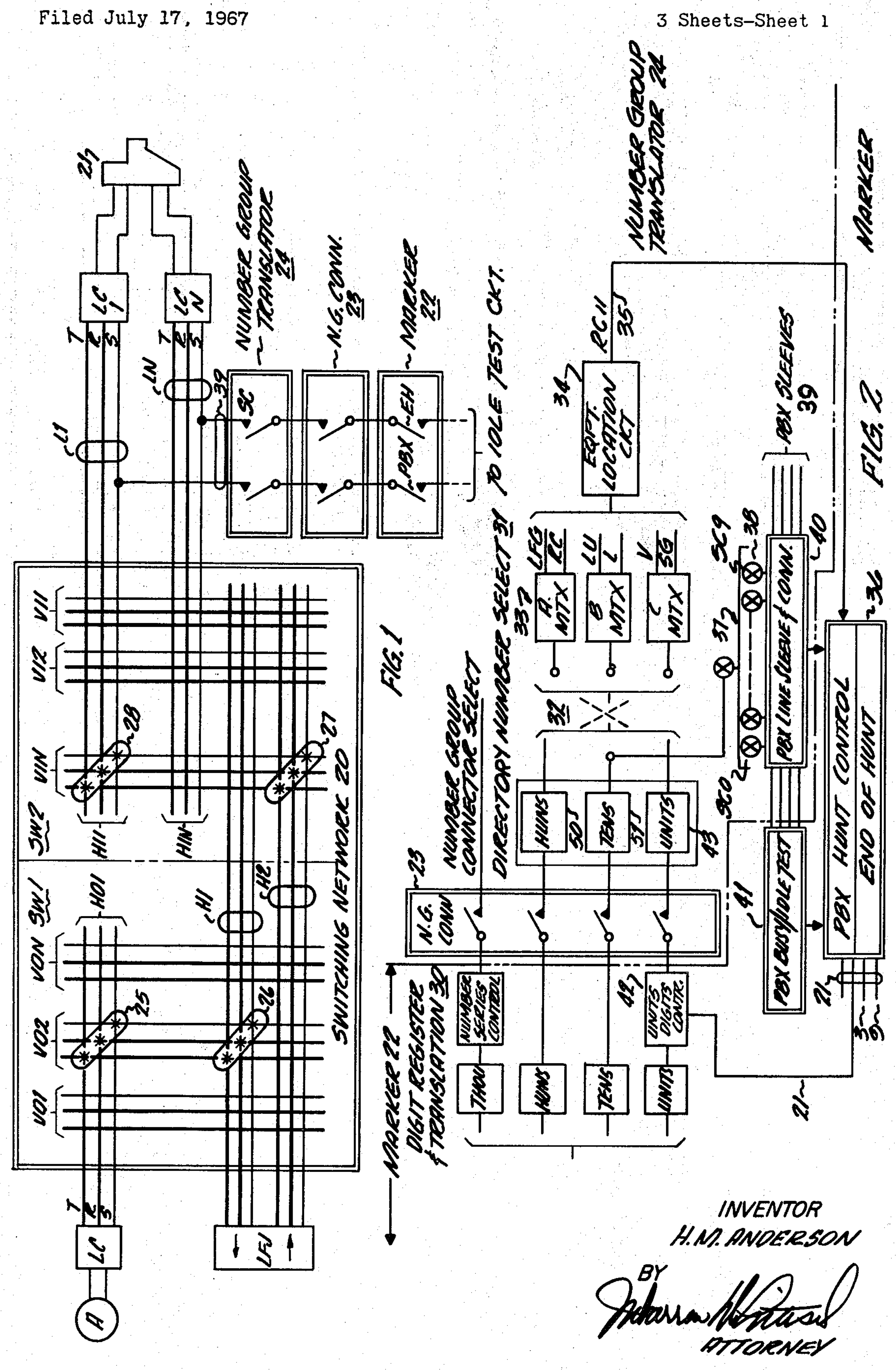
FIG. 1 is a block diagram showing part of a crossbar switching system of the type which may incorporate the invention.
FIG. 2 is a block diagram showing the principles of the number group translator, per se, and its relation to the marker.

The switching network 20 of FIG. 1 may have any known form. The particular network which was actually used in conjunction with this invention is an array of crossbar switches as shown in a co-pending U.S. patent application, S.N. 430,136 by Erwin, Field, and Mahood, filed Feb. 3, 1965, and entitled, Automatic Switching Matrix, and assigned to the assignee of this invention. Reference may be made so that application for a complete disclosure of an exemplary switching network which may be used to complete block of FIG. 1. The parts shown here are only those required for an understanding of this particular invention.

Briefly, the network includes any number of crossbar switches, each having verticals and horizontals arranged to provide intersecting crosspoints. For example, the drawing shows two switches SW1, SW2 separated by a dot-dashed line. Three of many verticals V01, V02 . . . V0N are shown in the left-hand switch SW1, and three smiliar verticals are shown in the right-hand switch SW2. A calling line A is shown as connected through its individual line circuit LC to a horizontal H01 on the left-hand switch. A PBX 21 is shown as connected via a number of line circuits $LC_1$ . . . $LC_N$, to horizontals H11 and H1N. Any suitable equipment (such as a line feed junctor LFJ shown here by way of example), is connected via horizontals H1, H2 which might extend across all of the verticals in all of the switches of the network 20. A line feed junctor, such as this, detects on-hook and off-hook conditions, furnishes talking battery, holds the connection during conversation, and releases the connection at the end of the conversation.

The network is controlled by a marker 22 of any well known form. The marker operates responsive to digital and other signal information sent by a calling subscriber to selectively control the network. In order to do this, the marker first causes a number group connector 23 identified by the thousands number in a called directory number to connect it to a number group translator 24 equipped to translate the hundreds, tens, and units digits of the directory numbers. Then, the marker applies a potential to a lead representing the called line which is identified by the dialed number. The number group translator 24 closes a sleeve cut through contact SC which connects the sleeve of the line identified by the called directory number to the marker which makes a busy test. If the line is idle, the translator reads out the location of the equipment which must be operated to complete a path to the called line.

A path which might be so completed through network 20 is represented by the "*x*-marks" which indicate operated cross-points. Therefore, as drawn in FIG. 1, a voice path may be traced from station A, through line circuit LC, horizontal H01, crosspoint 25, vertical V02, crosspoint 26, horizontal H1, line feed junctor LFJ, horizontal H2, crosspoint 27, vertical V1N, crosspoint 28, horizontal H11, line circuit $LC_1$, and the PBX 21. Hence, the station A is here shown as a calling line and PBX line $L_1$ as a called line. However, the PBX 21 may be reached via, not just one, but any in a group of many lines, here designated L1 . . . LN.

As long as the calling subscriber reaches the PBX 21, it is not important whether he uses line L1, line LN, or any other of the many lines (not shown). Therefore, it is conventional to use a single directory number to identify all of these lines as if they were one. The system must be adapted to select any idle one of these lines L1 . . . LN responsive to that single directory number. Thus, for example, if the directory number identifies line L1, and it is busy, the system merely selects line LN if it is idle. That is the process called "hunting," and it is completed by the marker responsive to the busy and idle potentials appearing on the sleeves 39 which are connected by the SC contacts in translator 24 to the marker 22.

In keeping with an aspect of the invention means are provided for identifying a group of PBX lines responsive to the reading out of an otherwise unused ringing code by the number group translator. The marker recognizes that particular ringing code as a signal which identifies a call requiring a PBX trunk hunting service. Thus, the marker knows that it must discard any information which it has received from the translator and begin again. To so indicate, the marker closes a PBX contact as a start of hunt signal to the translator. Thereafter, the translator operates an SC relay which connects an entire group of ten sleeves, identified by a single tens digit to the marker, regardless of the number of PBX trunk groups which might happen to be represented in that group of ten sleeve leads. The translator operates an end of hunt relay EH to mark the end of each PBX group in the ten sleeves so that the marker will stop hunting when it comes to the end of the small group. If an idle line is found, the marker operates a second sleeve cut through relay SC associated with the idle line to select it.

Figures 3, 4:
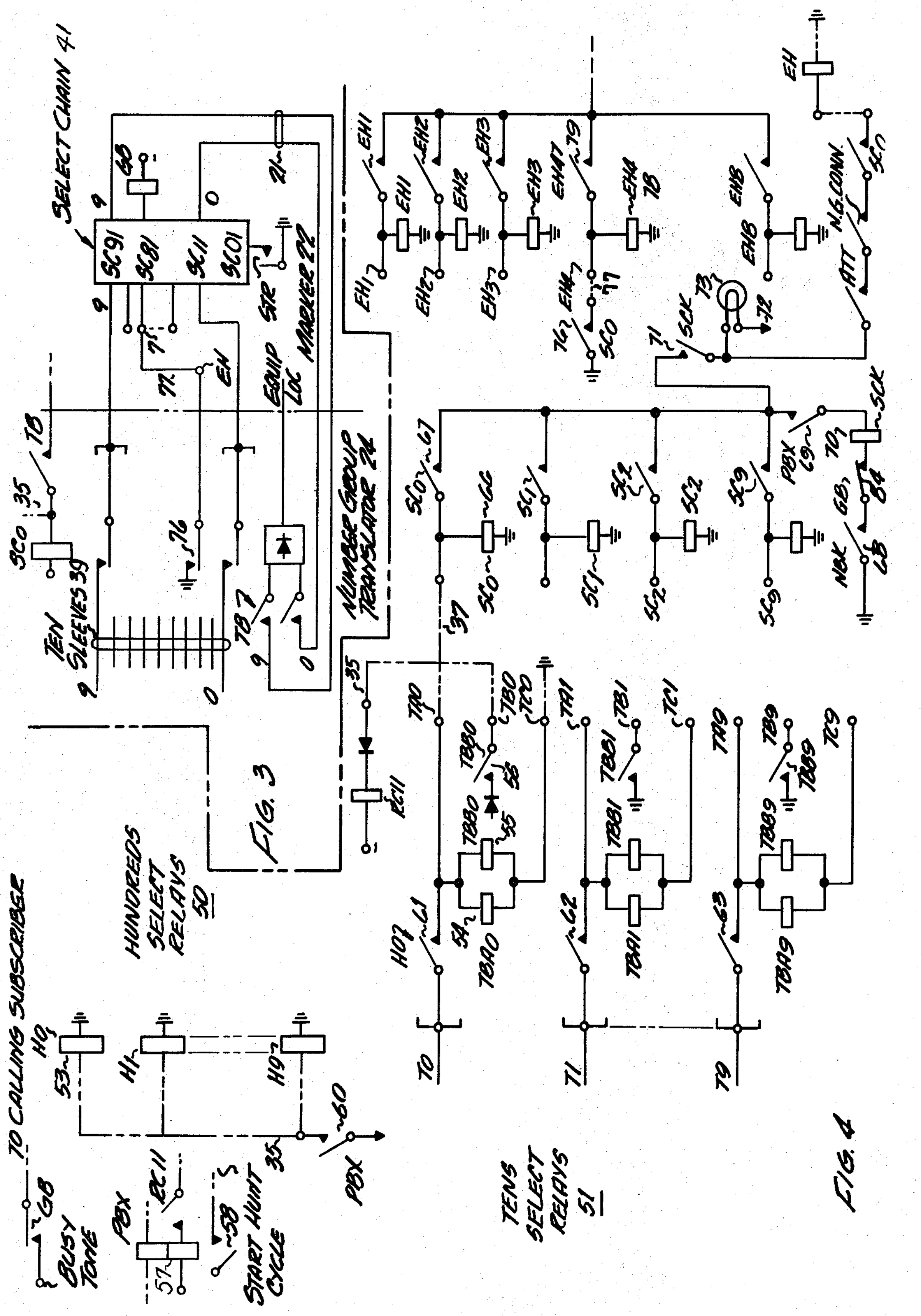
FIG. 3 shows the schematic layout of the pertinent equipment required for trunk hunting in small PBX groups.
FIGS. 4 and 5 are a schematic relay circuit which shows those portions of the number group translator and marker that are required for an understanding of the inventive functions and are schematically represented in FIG. 3.

The relationship between the number group translation means and marker used for providing the split group hunting should become more apparent from a study of FIGS. 2 and 3. In greater detail, the calling subscriber sends dial pulses which are initially stored in a register which transfers them to digit register 30 in the marker (FIG. 2). Then, a number group connector NG. CONN. 23 is selected on a basis of the thousands digit in the called number. The numbers group connector 23 selection is made on this basis because there is a separate number group translator for each thousands digit. The registers 30 are connected to a directory number selector 31 in the number group translator 24, in order to process the hundreds, tens, and units digits at 31.

The output from the selector 31 is connected at 32 to three matrices 33 having a readout circuit at 34 which identifies the equipment location of the called line in terms of: line frame group LFG, one-of-ten ringing codes RC (or PBX trunk group identification), line unit LU, level L, vertical V, and sub-level SL. When the identifications of these equipments are read out, the switching system operates to extend a switch path to a terminal having a called line connected thereto.

It should be noted that only ten ringing codes are required, but the identification capacity is generally greater than ten. Therefore, it costs almost nothing to read out an unused ringing code (such as $RC_{11}$) as the identification of a PBX number. That number $RC_{11}$ is indicated by a potential on wire 35 which appears in both FIGS. 2, 3.

Ultimately, the $RC_{11}$ code marking on conductor 35 (FIG. 2 or 3) causes the pertinent hundreds block relay to close the contacts for locking a tens block relay TB (FIG. 3) and a sleeve cut through relay (such as $SC_0$ assuming that the tens digit is "0," for example). Cross connectors at 37 provide this relationship between a tens block and a sleeve cut through relay.

Responsive to the operation of the relay $SC_0$, all ten sleeves 39 in a tens block are connected through to the marker. In addition, the SC relay has an extra contact 76 used to uniquely and individually identify the last sleeve in each of the small PBX trunk groups in the block of ten lines. By way of example, FIG. 3 shows that strap 77 interconnects the contacts 76 and an end of hunting EH terminal "2," "7" in this particular group of sleeves which are cut through by relay $SC_0$. The literal meaning of this strapping is that the first small PBX group includes the lines 0–7 in this tens group; a second PBX group begins at line 8 in this tens group and extends into the next tens block. If only one small group is initially assigned, another of the straps 77 might extend to another relay A—to indicate that the small PBX group extends into the lines identified by the next tens block of directory numbers. Thus, the PBX group starting with line "8" in one tens group continues to some undesignated line in the next tens group (for example, this PBX group could include the lines "18–22") as will become more apparent, the second group is entered responsive to the "units" digit in the directory number.

A start relay STR (not shown) operates to send ground up a chain of contacts through the relays $SC_{01}$–$SC_{91}$ and the relays $EH_1$–$EH_8$ in the marker 22. If any sleeve in the group 39 is marked by an idle potential, the $SC_{X1}$ relay associated therewith is operated. If none of the sleeves is idle, the chain is broken at an end of hunting relay EH operated via strap 77. Therefore, the ground potential at the contacts STR is further applied through contacts on the operated EH relay to energize a group busy relay GB. If relay GB operates, a suitable busy signal is returned to the calling subscriber.

Assuming that at least one of the sleeves is marked with an idle potential, the ground signal applied from the contacts STR through operated contacts on an operated SC relay, conductors 21, and diode fields 43, 43 to the equipment location leads. The equipment 30 identified by these location leads is a crosspoint which operates and thereby completes the desired connection. That crosspoint is, of course, individually associated with the selected line in the PBX group.

It should be noted that only one SC relay is required for any group of ten subscriber lines regardless of the number of PBX groups served by those ten lines. The EH and $SC_{X1}$ relays used to mark the end of hunt position and sleeve selected for each group, are in the marker; therefore, they are shared by all PBX groups, and do not increase in number as the groups become smaller. Moreover, the maximum number of SC relays in the translator are also known; there is no uncertainty wherein the number of SC relays may exceed the available rack space.

Figure 5:
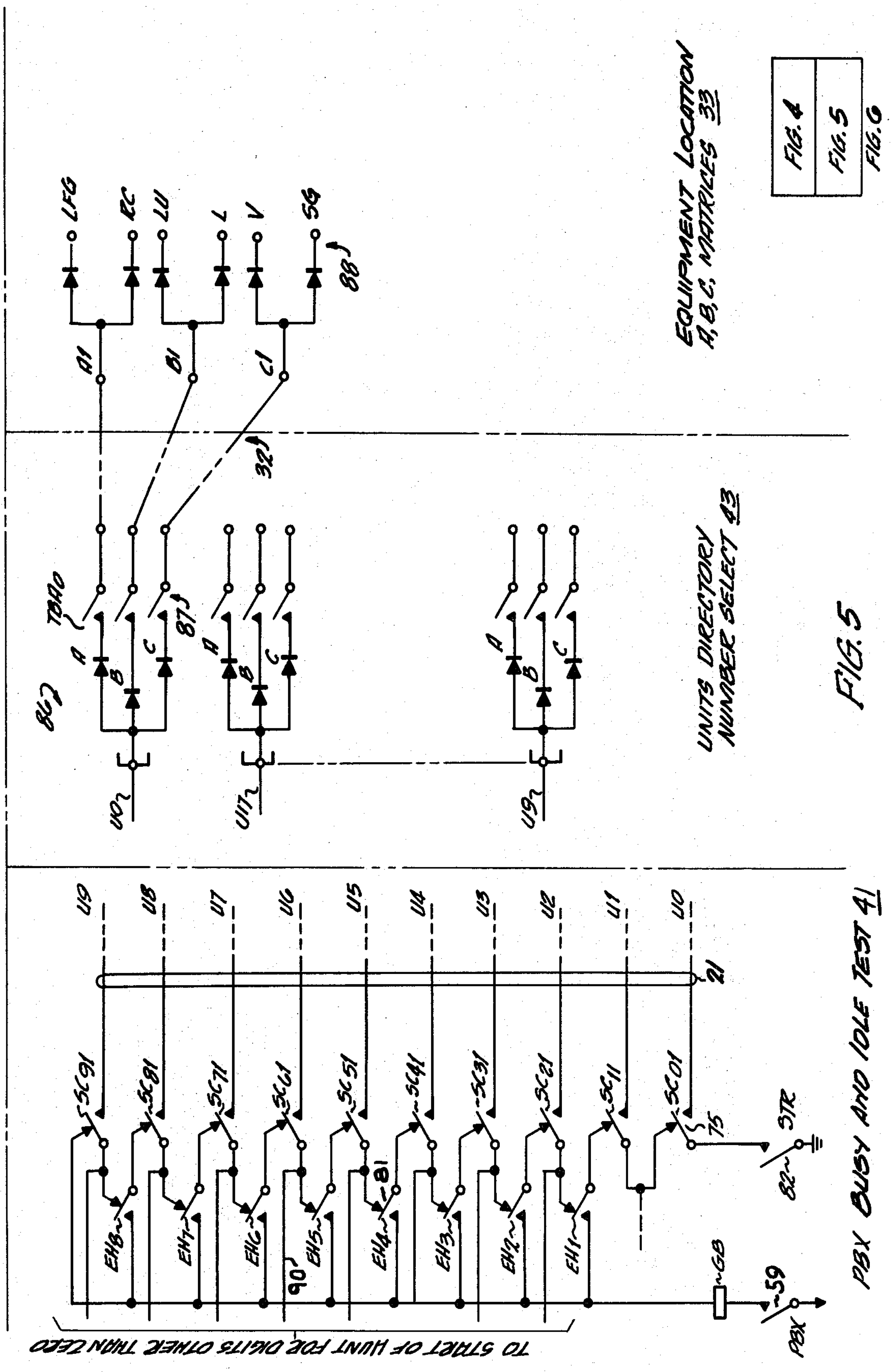

FIGS. 4 and 5 show the specific circuitry used in one exemplary system to achieve the split group hunting. To conserve space, the drawing shows only a few of many duplicated circuits. For example, three of ten hundreds relays are shown as H0, H1, . . . H9 (FIG. 4). Any suitable number of other similar relays may also be provided, as required. In a similar manner, other equipment may also be duplicated, as required. Since all of the components of FIGS. 4 and 5 are well known to those skilled in the art, it is thought that the invention will be fully understood from a description of the operation of this exemplary circuit. The relationship between the various figures should be apparent from a comparison of reference numerals.

After the subscriber sent digits are registered at 30 (FIG. 2), the thousands digit is used to select and operate one of many number group connectors N.G. CONN. 23. One of the hundreds relays operates in block 50 and one of the tens relays operates in block 51. If a PBX group of lines is identified by the directory number "1000," for example, the "1" number group connector (N.G. CONN.) switch 23, the "0" hundreds, and the "0" tens block relays 53, 54, 55 are operated. The operation of relay 55 closes the contacts 56 to mark the optional strapping 35, shown by dot-dashed lines. An unused ring code select relay RC11 operates as any ringing code select relay operates responsive to a read out of the called number code. Here it is assumed that there are only ten codes so that the eleventh is not used for ringing purposes.

Responsive to the operation of relay $RC_{11}$, a PBX relay 57 operates to close contacts 58 and thereby start the trunk hunting cycle. Contacts 59 (FIG. 5) close to prepare a PBX busy and idle test and selection circuit 41. Also, contacts 60 (FIG. 4) close to lock the "0" hundreds relay 53 in its operated position which, in turn, holds all of the "H0" contacts (three of which are shown at 61, 62, 63) in a closed position to keep the relays 54, 55 in their operated positions (an assumption being that wire T0 is marked and wires T1 . . . T9 are not marked).

Since it has been assumed that the PBX directory number is "1000" and further that this is the number received from the calling subscriber, an arbitrarily connected strapping 37 is present to operate the $SC_0$ sleeve cut through relay 66. Responsive thereto, relay 66 closes its contacts 67. In the operated number group connector 23, a set of contacts 68 are closed to operate a sleeve check (SCK) relay 70 via contacts 69 on the PBX relay, contacts 67, strapping 37, and contacts 61, to a battery marking on the conductor T0. Contacts 71 close, and the potential of the battery 72 is applied through the resistance of lamp 73 to the windings of the relays 66, 54, 55 in parallel. These relays are now lock operated independently of their original operate circuits, and they will remain so locked until the end of the hunt cycle.

Responsive to the operation of the particular number group translator sleeve cut through relay SC selected by the strap 37 (here relay $SC_0$), a particular group 39 (FIG. 2) of the ten sleeve leads identified by the assumed directory number "1000" are cut through. Also responsive to the operation of $SC_0$ relay 66, contacts 76 close a circuit to a particular one or more of the end of hunt relays EH according to the connections of the arbitrary strapping 77. As here shown, the strapping is connected to terminal EH4 which means that the PBX group includes the five lines designated by the directory numbers "1000, 1001, 1002, 1003, 1004," under the above stated assumption that the PBX directory number is "1000." If there was one less or one more in the group, the strap 77 would be connected to the terminal EH3 or EH5 (not shown) respectively. If more than one strap 77 is provided to make the end of more than one group, isolating diodes will be included to prevent feedback paths.

When EH4 relay 78 operates, it locks via its contacts 79. Also responsive to the operation of the end of hunt EH4 relay 78, contacts 81 close in the PBX busy and idle test and connect circuit 41 (FIG. 5) to prepare a circuit for the group busy relay GB.

Next, any suitable start relay STR operates contacts 82 to cause the trunk hunting process to begin at the line 0. The next function depends upon which, if any, of the sleeves is marked with an idle potential. Any sleeve which is so marked with idle potential causes in an $SC_{X1}$ contact to operate in the marker. Thus, if all sleeves are idle, a path selection extends from ground through contacts 82, 75, to terminal $U_0$. The zero line 1000 (in this example) is selected. If sleeve $SC_{01}$ is busy and sleeve $SC_{11}$ is idle, a path extends from ground through contacts 82, 75 (unoperated), and $SC_{11}$ (operated), to terminal $U_1$. In like manner, each busy sleeve condition operates an SC relay which advances the select chain of contacts SC to select the next idle sleeve.

If all sleeves in this particular line group are marked with a busy potential, none of the SC contacts are operated. Therefore, contacts to the operated contacts 81 on relay EH4, and through the winding of the group busy relay GB to the battery potential applied through the contacts 59 on the PBX relay. When the group busy relay GB operates, the contacts 84 open to release the sleeve check relay SCK (FIG. 4). Responsive thereto, the contacts 71 open to remove the battery potential which has been holding relays 54, 55, 66. Busy tone is returned in any suitable manner, and the circuit thereafter returns to normal when the calling subscriber hangs up.

If there is a sleeve with an idle potential, the preference chain of $SC_{X1}$ contacts in the circuit 41 selects the idle sleeve having the lowest directory number. Assume that it is sleeve $SC_{01}$. Ground is applied through contacts 82, $SC_{01}$ (operated), lead U0, diodes 86 in the A, B, and C matrices, contacts 87 on the operated tens block relay $TBA_0$, arbitrary jumpers 32 to a number of terminals $A_1$, $B_1$, C, and a number of isolating diodes 88 which are connected to leads individually identifying a line frame group LFG, a ringing code RC, a line unit LU, a level L, a vertical V, and a particular sleeve group SG. These identifications are the address of a particular crosspoint in the network 20. An operation of the specific crosspoint which is so identified makes a connection to a specific one of the lines in the PBX group. For example, this particular crosspoint may be the crosspoint 28 of FIG. 1.

If the foregoing description is reviewed, it will be found that the system has hunted over a line group extending from the particular line which is identified by the number actually dialed by the calling subscriber to the line having the directory number marked by the strap at 77.

To search over a second group of lines in the same block of ten directory numbers, the strap 37 is connected between another terminal, such as $TB_6$ (not shown) and the $RC_{11}$ relay. That terminal is marked when, say the directory number "1006" is dialed, for example. Assuming, thusly, that the second group starts with the digit "6," any suitable means operates to mark the terminal 90 (FIG. 5). If the "6" sleeve is idle, a circuit in the marker is completed through operated contacts $SC_{61}$ to conductor $U_6$, a jumper wire (not shown) to circuit 43 and on, as described above. If sleeve "6" is marked busy, contacts $SC_{61}$ are unoperated, and the circuit is completed through the operated contacts $SC_{71}$ if sleeve "7" is idle. In a similar manner, the potential that is incoming on wire 90 is passed on up the select chain 41 until it either reaches an operated set of contacts $SC_{X1}$ which identify an idle line or the group busy relay GB.

The drawings (FIG. 4) show a relay EH which has not been explained heretofore. This relay includes, as part of its operate circuit, the contacts of an "advance of trunk hunt" relay ATT. This relay ATT is one of which operates, in any known manner, whenever a single PBX trunk group includes trunks identified by more than one tens digit. Responsive to operation of the ATT relay, the system undertakes "block hunting"; that is, it advances the trunk hunting to the block of directory numbers identified by the next tens digit. The relay EH and contacts ATT are shown here because the inventive split group trunk hunting may be combined with block hunting to provide a greater flexibility in number assignment.

While the principles of this invention have been described above in connection with specific apparatus and applications, it is to be understood that this description is made only by way of example and not as a limitation in the scope of the invention.

I claim:

1. A crossbar telephone switching system comprising a plurality of subscriber lines identified by directory numbers, at least some of said lines being grouped together and identified by a single directory number, means responsive to a receipt of said single number for selecting any idle line in said group of lines, means whereby the number of lines in said group of lines is independent of the number of directory numbers in a naturally occurring block of directory numbers, means for translating the identity of the idle line found responsive to said directory number to enable any arbitrarily located equipment to be used to complete the connection to the idle line which is so found, wherein said translating means comprises a start hunting means operated responsive to a translation of said directory number, a plurality of end of hunting means individually associated with each number in said naturally occurring block of numbers, and means responsive to the recepit of said single number for operating a selected one of said end of hunting means to define the last line in said group of lines identified by the directory number of said group of lines.

2. A number group translator for use in a crossbar switching system comprising means responsive to the receipt of directory number indicating signals for operating said number group translator to indicate the location of equipment identified by a called number, means responsive to certain directory number signals for cutting through a group of ten sleeves, means common to all sleeves and operated responsive to at least one of said equipment location indications for marking first and last trunks in said group of ten trunks independently of any relationships between the number of trunks in said group of trunks and naturally occurring block of numbers in a sequence of numbers, and means for selecting any idle one of said trunks in the group of trunks falling between said first and last trunks.

3. The translator of claim 2 and means for reapplying indications representing said selected trunk to said number group translator, and means responsive to a new read out of said number group translator for operating equipment at the location indicated thereby.

4. The translator of claim 2 and means whereby said one of said equipment locations may be that represented by any directory number in said block of numbers.

References Cited

UNITED STATES PATENTS 3,283,081 11/1966 Basset.

RALPH D. BLAKESLEE, Primary Examiner